Nov. 9, 1943.    H. F. BAUER ET AL    2,334,059
PREPARATION OF PRECOOKED FOOD PRODUCTS
Filed Aug. 16, 1940
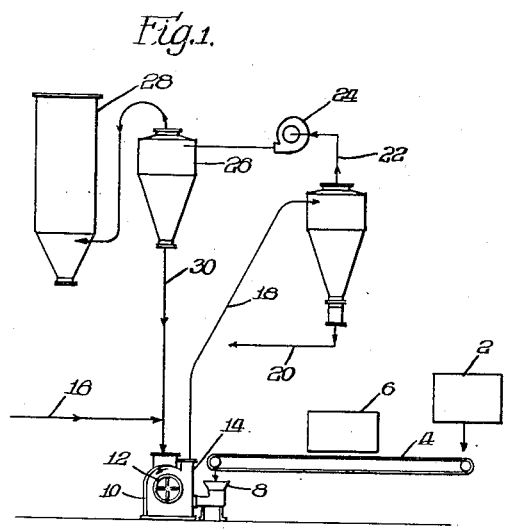
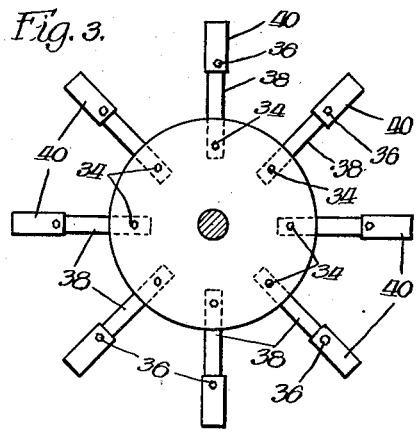
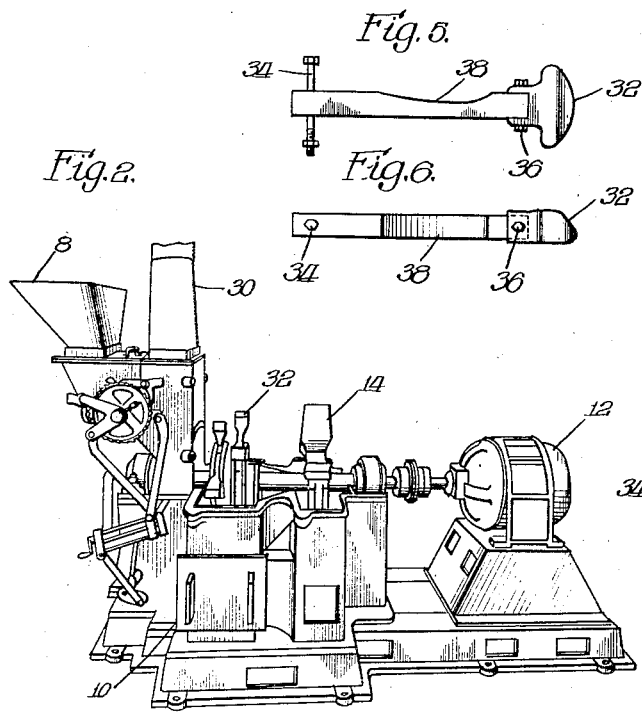
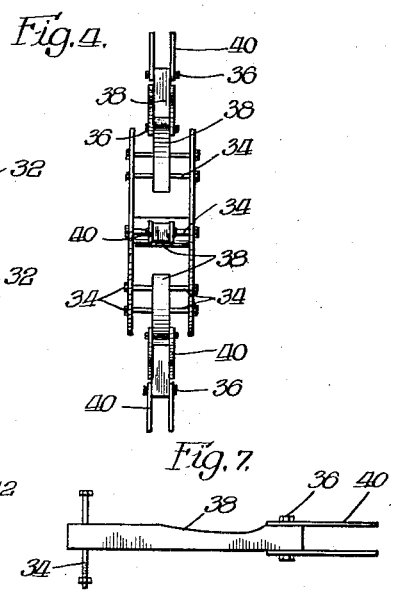
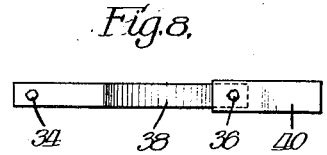
INVENTOR.
Hans F. Bauer
Elmer F. Glabe
BY
Spencer, Marshall, Johnston & Cook
Attys.

Patented Nov. 9, 1943

2,334,059

UNITED STATES PATENT OFFICE 2,334,059

PREPARATION OF PRECOOKED FOOD PRODUCTS

Hans F. Bauer and Elmer F. Glabe, Chicago, Ill., assignors to Stein, Hall Manufacturing Company, Chicago, Ill., a corporation of Delaware Application August 16, 1940, Serial No. 352,834

9 Claims. (Cl. 99—124)

This invention relates to the preparation of pre-cooked food products and more particularly to the preparation of dried vegetable for soups or as ingredients of soups.

The present invention is a continuance of the development described in the co-pending application of Hans F. Bauer, Serial No. 120,688, filed January 15, 1937, one of the joint inventors herein.

As is well known, when vegetables have been dried in order to preserve them, it requires a relatively long period of time to prepare them in an edible form. In the first place, it is normally necessary to soak the vegetable for a substantial period of time. After the vegetable has been soaked, a substantial period of time is required to cook it. If the vegetable is not soaked in advance and is not cooked sufficiently, the result will be generally unsatisfactory due to hardness, unpalatability, or for other reasons.

One of the objects of the present invention is to provide a new and improved method for preparing vegetables in a dry form in which they are readily preserved and from which they may be readily dispersed in water without soaking and with a minimum amount of cooking to produce a palatable food.

Another object of the invention is to prepare dried vegetables which are converted into soups of excellent consistency and palatability merely by dispersing in water and heating for a very short time.

Another object of the invention is to prepare precooked vegetable materials in a dry form adapted to be dispersed in water to form soups.

A further object of the invention is to provide a method of preparing dried vegetable containing soups wherein the dispersibility of the vegetable may be controlled to a greater or lesser extent, as desired, by the process of preparing them in the dried form.

Another object of the invention is to provide a process for treating dried vegetables which are not in a readily dispersible form in order to convert them to dried vegetables that are in a readily dispersible form.

Another object of the invention is to provide new and improved readily dispersible dried vegetables. Other objects will appear hereinafter.

These objects are accomplished in accordance with this invention by adding to a vegetable, preferably a vegetable containing a substantial amount of starch, a controlled amount of water and then subjecting the moistened vegetable to controlled conditions of time and temperature without allowing substantial evaporation and with or without the addition of auxiliary materials, as more fully hereinafter described.

According to one method of practicing the invention a vegetable in a normally air dried state is pre-moistened in order to add more water than normally present, the added water being preferably about 15% to about 125% based upon the weight of the vegetable, this amount of water being an additional amount of water to that present in the vegetable in its normally air dried state. The total moisture content in the pre-moistened state will vary depending upon the particular type of vegetable material. Thus, for peas the amount of moisture added is preferably about 25% to about 75% by weight of the peas, while for beans about 50% to about 100% moisture is preferably added.

After the vegetable has been moistened, if there is any excess water, this may be removed by draining. It is preferable to employ a vegetable which has already been split or broken or comminuted to reduce the particle size. It may be desirable in certain instances to screen the pre-moistened vegetable in order to break up any lumps. At this point the pre-moistened vegetable contains a sufficient amount of water to insure the partial gelatinization of any starches present when heated in an atmosphere of steam, but the amount of water present is normally insufficient to cause the vegetable to assume a fluid state. In other words, the body or consistency of the vegetable is still substantially solid.

The moistened vegetable is then subjected to heating under such conditions as to prevent substantial evaporation of the moisture from the vegetable. This is preferably accomplished by direct steaming. The steaming is carried on for a period of time sufficient to pre-cook the vegetable to a state such that the vegetable will disperse in water when subsequently dried and ground. The amount of pre-cooking may be varied in accordance with the desired dispersibility of the final product. For example, if it is desired that the final product disperse in cold water, the amount of pre-cooking may be substantially complete. On the other hand, if it is desired that the product disperse only when heated with water or when added to hot water, then the amount of pre-cooking may be less. Generally speaking, the latter type of treatment is employed, because it is normally desirable or necessary to heat the vegetable to make it more palatable.

After steaming, the vegetable may be dried somewhat, if necessary, and is then subjected to a simultaneous drying and grinding operation. This is preferably accomplished by passing the steamed vegetable directly into a mill, preferably a modified type of hammermill where the vegetable is heated with a current of hot air and simultaneously ground and dried. The product may be separated into different particle sizes by any suitable kind of mechanical air separator, or in any other suitable manner.

The taste and other properties of the final products may be modified by adding auxiliary materials to the vegetable material during the process, for example, in order to preserve the color it may be desirable to add a mild alkali such as sodium carbonate. One of the preferred embodiments of the invention consists in the addition of an acid to the vegetable during the pre-moistening period. It has been found that this addition facilitates the preparation of the vegetable and adds to the palatability of soups prepared therefrom. It will be understood that the invention is not limited to the addition of any particular acid or alkaline materials in order to modify the properties of the products. Flavoring materials and other auxiliary agents may also be added during the process of preparing the vegetable, preferably in the pre-moistening stage.

Other features and advantages of the invention will be apparent by reference to the following description in conjunction with the accompanying drawing, in which:

Figure 1 represents diagrammatically the steps involved in carrying out the process, together with a suitable type of apparatus;

Figure 2 illustrates in side elevation a portion of the apparatus in which the simultaneous drying and grinding of the product is effected;

Figure 3 is a side view illustrating the arrangement of the hammers in a typical hammermill of the type shown in Figure 2;

Figure 4 is an end view of the arrangement shown in Figure 3;

Figure 5 is a detailed view of a hammer such as is used in a typical hammermill;

Figure 6 is a side view of the hammer shown in Figure 5;

Figure 7 is a top view of a modified device preferably employed in accordance with the present invention instead of the typical hammers;

Figure 8 is a side view of the device shown in Figure 7.

As shown in Figure 1, the vegetable material of the desired size passes through a pre-moistening stage generally indicated at 2 and after being pre-moistened is preferably fed by means of a belt conveyor 4 through a steaming chamber 6 and thence to the feed box 8 of a mill 10. The mill 10 is provided with a motor 12 for driving the mill. The motor 12 also drives a fan 14. The pre-moistened steamed vegetable material passes into the mill where it is dried by means of hot air introduced through conduit 16 from any suitable type of furnace. Hot air passes into the mill and is circulated by means of fan 14 through a conduit 18. The temperature of the hot air may be as low as 200° F. or as high as 1500° F. As the hot air passes through the mill the vegetable material is simultaneously dried and ground and is carried by means of the hot air through conduit 18 to a cyclone collector where most of the dried material is separated from the air stream and is removed as the finished product through a conduit 20.

Any unseparated material passes through a conduit 22 and is driven by means of a vent fan 24 to a concentration collector where further separation takes place and fines may be removed through conduit 26 to bins 28, or it may be returned directly to the mill where it is mixed with further fresh material. The still warm air is returned through conduit 30 toward mill 10 and is heated again by air coming from the furnace through conduit 16. The process may be operated as a continuous, semi-continuous or batch process.

As shown in Figure 3, in a well known type of hammer-mill the hammers 32 are mounted on a shaft 34. The appearance of the hammers is normally as illustrated by Figure 5, in which the hammer 32 is mounted loosely by means of a bolt 36, rivet, or other suitable means on an arm 38 which in turn is mounted on a shaft 34. It has been found in accordance with the present invention that the use of such a hammer in the hammermill may grind the vegetable too finely. To offset this difficulty the hammers 32 were replaced by means of steel bars or blades 40, as shown in Figure 7, these blades having a cutting action rather than a pulverizing action. The blades employed are normally strips of steel about ⅛" thick.

The invention will be further illustrated but is not limited by the following example, in which the quantities are stated in parts by weight unless otherwise indicated:

*Example*

Approximately 100 lbs. of dried split peas were placed in a vat and soaked in a solution of hydrochloric acid. The hydrochloric acid solution was prepared by adding .75 lb. of water per pound of peas and 0.5 cc. to 4 cc. of concentrated hydrochloric acid per pound of peas. The peas were allowed to soak at a temperature below the gelatinization temperature of any starches present, the particular temperature employed being 100° F. The soaking operation was carried out for 30 minutes with occasional agitation. By this time the peas had absorbed most of the water and swelled slightly, although they were still hard. The peas were then poured onto a screen where any unabsorbed solution was drained off.

The peas were thereafter placed on trays in a steam box and live steam was injected at atmospheric pressure. The steaming operation may be carried out for from 15 minutes to 45 minutes, depending upon the degree of cooking desired. The steam was then shut off and the peas were taken out. The peas are preferably steamed to such an extent that they are still solid but become mealy when squeezed.

The pre-moistened steamed peas may then be passed through the mill with or without cooling. The mill employed was substantially the same as the one described in conjunction with the drawing utilizing the modified form shown in Figure 7 wherein the steel blades or bars 40 replace the hammers 32 of Figure 5.

The heated air in the mill at the point where the grinding operation was carried out was maintained around 290° F. to 320° F. and the temperature in the first cyclone collector was around 180° F.

The product obtained was sufficiently fine to pass a 30 mesh screen, everything larger being sent back through the mill.

An excellent soup was obtained with suitable flavoring materials by adding the product of the above example to water and heating to approximately the boiling point. The time and temperature of heating in order to disperse the product in water may vary. Ordinarily it will be sufficient to heat the product in water at a temperature at or near the boiling point for about one to two minutes.

The product is characterized particularly by its tendency to disperse immediately and form a homogeneous soup. In general, the products of the invention form pastes or dispersions with water of smooth texture which do not set on standing.

In a manner similar to that described in the example other food products may be prepared. Among the starting materials which may be employed are, for instance, all types of dried vegetables as dried split peas, either all green or all yellow, or mixed in any percent, dried beans, dried lima beans, Michigan navy beans, and dried lentils. The invention is especially applicable to the treatment of dried vegetables, and particularly legumes, because such starting materials are readily available at all seasons of the year at relatively low costs. However, the invention may be applied to the corresponding fresh vegetables. Nor is it limited to vegetables of the legume family. It may also be employed in the preparation of dried products from carrots, rutabagas, turnips and other root type vegetables. Where a fresh vegetable is employed in accordance with the invention less water will normally be required in the pre-moistening stage. Dried cereal foodstuffs may also be prepared in accordance with the invention from wheat, rye, barley, oats, rice, corn and other cereals.

In practicing the invention, the pre-moistening treatment may be varied to obtain various effects on color and flavor. As previously indicated, it has been found that the presence of an acid added to the vegetable material during the process has a beneficial effect. The use of an auxiliary material such as an acid or an alkali has the effect of varying the pH value of the material undergoing treatment, and this in turn coupled with the steaming process and the simultaneous drying and grinding while the material is still in a moist state may have varying effects upon the product obtained. For example, where peas are employed as the raw material and where no acid is employed, the pH will ordinarily be around, say, 6.85. The addition of 5 cc. of concentrated hydrochloric acid per 750 grams of water per 1000 grams of peas will ordinarily reduce the pH to around 6.2 and a somewhat lower pH value may be used. It is preferable to have the pH within the range from about 6.0 to about 6.85 with most vegetable materials. If an alkali is employed, the pH may be within the range of about 6.85 to about 7.7, or even somewhat higher.

The expression "heating in an atmosphere of steam" as herein employed includes not only direct steaming as previously described but also pressure cooking. Superatmospheric pressure and temperature conditions may be employed to accelerate the cooking.

The invention is not limited to the use of any particular acids or alkalies. Although hydrochloric acid is preferred, any other edible acid may be used, as, for instance, citric acid, tartaric acid, malic acid and acetic acid. It will be understood, of course, that the type of acid used may have some effect upon the taste. In the same way other edible alkalies may be employed, although sodium carbonate is usually preferred. The addition of hygroscopic materials is ordinarily undesirable because of their tendency to absorb water and cause caking. It is possible, however, to add small amounts of salts or other auxiliary materials for various purposes without interfering with the non-caking qualities of the product. Among the materials which may be added are calcium citrate, calcium chloride, sodium iodide, potassium iodide, thiamine chloride, beta carotene, ascorbic acid and sodium diacetate. The added materials may be acid, neutral or alkaline and may serve as flavoring agents, vitamin sources, preservatives or perform other functions.

The products prepared in accordance with the invention are normally free flowing, non-caking and uniform, although it will be understood that these products may be molded into the form of cakes, briquets, or the like. The invention provides a direct, inexpensive method of preparing pre-cooked dried foodstuffs which readily disperse in water to form soups and the like. These products and the dispersions made therefrom accordingly have certain advantages over the ordinary type of dried food which has to be soaked a relatively long period of time and then cooked for a relatively long period of time before it is ready for use.

Having thus described the invention, what we claim as new and desire to secure by Letters Patent of the United States is:

1. A method of preparing pre-cooked dried foodstuffs which comprises adding moisture to a vegetable food material sufficient to cause said material to take up a substantial amount of said moisture while still retaining a substantially non-fluid form, heating the vegetable material so moistened in an atmosphere of steam and simultaneously drying and grinding the thus prepared product while still in a moist state.

2. A method of preparing pre-cooked dried foodstuffs for soups which comprises adding at least about 15% moisture to a vegetable material, the amount of moisture added being insufficient to cause said material to assume a fluid form, steaming the vegetable material so moistened and simultaneously drying and grinding the thus prepared product while still in a moist state.

3. A method of preparing pre-cooked dried foodstuffs capable of being dispersed in water upon heating for a relatively short period which comprises adding about 15% to about 125% of moisture to a dried raw vegetable food material, steaming the vegetable material so moistened and simultaneously drying and grinding the thus prepared product while still in a moist state.

4. A method for preparing pre-cooked dried foodstuffs suitable for dispersion in water to form soups which comprises adding moisture to a dried raw legume vegetable sufficient to cause said legume to take up a substantial amount of said moisture while still retaining a substantially non-fluid form, steaming the legume material so moistened and simultaneously drying and grinding the thus prepared product while still in a moist state.

5. A method of preparing pre-cooked dried legume vegetables suitable for forming soups when dispersed in water which comprises adding moisture and an edible acid to a dried raw legume, maintaining said legume in contact with said moisture under acid conditions for a substantial period of time sufficient to cause said legume to swell while still retaining a substantially non-fluid form, steaming the legume material so moistened for a substantial period of time sufficient to partially gelatinize any starch present therein and simultaneously drying and grinding the thus prepared product while still in a moist state.

6. A method of preparing a pre-cooked dried foodstuff for use in making soups which comprises adding moisture to a dried raw vegetable while maintaining a pH within the range of about 6.00 to about 6.85, the amount of moisture added being sufficient to cause said vegetable to swell but insufficient to convert it to a fluid form, steaming the vegetable so moistened and simultaneously drying and grinding the thus prepared product while still in a moist state.

7. A method of preparing a dried soup composition from peas in a form in which said composition will disperse in hot water almost immediately which comprises adding about 25% to about 75% moisture to dried split raw peas in the presence of hydrochloric acid sufficient to maintain a pH below about 6.85 but above about 6.00, steaming the moistened peas and simultaneously drying and grinding the thus prepared product while still in a moist state.

8. A method of preparing a dried soup composition from peas in a form in which said composition will disperse to a soup in hot water almost immediately which comprises adding moisture to dried split raw peas in the presence of hydrochloric acid, the amount of moisture corresponding to about .75 lb. of water per pound of peas and the amount of hydrochloric acid corresponding to about 0.5 cc. to about 4 cc. of concentrated hydrochloric acid per pound of peas, allowing the peas to soak with occasional agitation for about 30 minutes, draining off any excess moisture, steaming the peas so moistened at atmospheric pressure for a period from about 15 to 45 minutes and simultaneously drying and grinding the thus prepared product while still in a moist state.

9. A method of preparing a pre-cooked dried pea composition for use in making soups which comprises adding about 25% to about 75% of moisture in the presence of an edible acid to dried raw split peas while mantaining a pH within the range of about 6.00 to about 6.85, steaming the peas so moistened for a period from about 15 minutes to about 45 minutes and simultaneously drying and grinding the thus prepared product while still in a moist state, the product being subjected to a cutting action during the grinding operation.

HANS F. BAUER.
ELMER F. GLABE.